US008578139B2

(12) United States Patent
Chaussade et al.

(10) Patent No.: US 8,578,139 B2
(45) Date of Patent: Nov. 5, 2013

(54) CHECKPOINTING LONG LATENCY INSTRUCTION AS FAKE BRANCH IN BRANCH PREDICTION MECHANISM

(75) Inventors: Nicolas Chaussade, Mouans-Sartoux (FR); Florent Begon, Antibes (FR); Mélanie Emanuelle Lucie Teyssier, Grasse (FR); Rémi Teyssier, Grasse (FR); Jocelyn Francois Orion Jaubert, Antibes (FR)

(73) Assignee: ARM Limited, Cambridge (GB)

( * ) Notice: Subject to any disclaimer, the term of this patent is extended or adjusted under 35 U.S.C. 154(b) by 507 days.

(21) Appl. No.: 12/805,567

(22) Filed: Aug. 5, 2010

(65) Prior Publication Data

US 2012/0036340 A1 Feb. 9, 2012

(51) Int. Cl.
*G06F 9/30* (2006.01)
(52) U.S. Cl.
USPC .............................. 712/228; 712/239; 714/13
(58) Field of Classification Search
None
See application file for complete search history.

(56) References Cited

U.S. PATENT DOCUMENTS 3,736,566 A * 5/1973 Anderson et al. ............... 714/15
5,269,017 A * 12/1993 Hayden et al. .................. 714/15
5,651,124 A * 7/1997 Shen et al. ..................... 712/215
7,475,230 B2 * 1/2009 Chou et al. ..................... 712/228
7,996,663 B2 * 8/2011 Stillwell et al. ............... 712/244

OTHER PUBLICATIONS

Hwu W. et al., "Checkpoint Repair for Out-of-order Execution Machines", Proceedings of the 14th Annual International Symposium on Computer Architecture, (1987), pp. 18-26.

* cited by examiner

*Primary Examiner* — Kenneth Kim
(74) *Attorney, Agent, or Firm* — Nixon & Vanderhye P.C.

(57) ABSTRACT

A data processing apparatus and method of data processing are provided. The data processing apparatus comprises execution circuitry configured to execute a sequence of program instructions. Checkpoint circuitry is configured to identify an instance of a predetermined type of instruction in the sequence of program instructions and to store checkpoint information associated with that instance. The checkpoint information identifies a state of the data processing apparatus prior to execution of that instance of the predetermined type of instruction, wherein the predetermined type of instruction has an expected long completion latency. If the execution circuitry does not complete execution of that instance of the predetermined type of instruction due to occurrence of a predetermined event, the data processing apparatus is arranged to reinstate the state of the data processing apparatus with reference to the checkpoint information, such that the execution circuitry is then configured to recommence execution of the sequence of program instructions at that instance of the predetermined type of instruction.

10 Claims, 4 Drawing Sheets

CHECKPOINTING LONG LATENCY INSTRUCTION AS FAKE BRANCH IN BRANCH PREDICTION MECHANISM

BACKGROUND OF THE INVENTION

1. Field of the Invention

The present invention relates to a data processing apparatus configured to execute a sequence of program instructions, the data processing apparatus having checkpoint circuitry configured to store checkpoint information indicative of a state of the data processing apparatus at a selected point when executing that sequence.

2. Description of the Prior Art

In a data processing apparatus configured to execute a sequence of program instructions it is known to provide checkpoint circuitry which is configured to store checkpoint information which identifies a state of the data processing apparatus at a given point in the instruction execution sequence. This checkpoint information provides a reference point which the data processing apparatus can use to return to that point if required.

One example where such checkpoint information may be required is in a data processing apparatus configured to perform speculative instruction execution, wherein program instructions are executed before it is confirmed whether they are in fact required to be executed or not. For example, based on observation of previous outcomes, the data processing apparatus may predict the result of a branch instruction and speculatively execute the instructions which follow the expected outcome of that branch instruction. If it later turns out that the predicted outcome of the branch instruction was incorrect, checkpoint information identifying the state of the data processing apparatus when it encountered the branch instruction can be used to rewind the state of the data processing apparatus to that point, to then continue down the correct branch.

The provision of checkpoint circuitry configured to store checkpoint information in such a data processing apparatus naturally represents a cost overhead for the system, and furthermore the frequency with which such checkpoint information is stored is a trade-off which the system designer must decide. Whilst very frequent checkpointing has the advantage that a correspondingly large number of checkpoints exist to which the data processing apparatus can return and hence a large "rewind" will not be necessary, this naturally has the disadvantage that provision must be made for storing a large number of items of checkpoint information.

Another approach is to store checkpoint information on a counter basis, wherein checkpoint information is stored when a predetermined number of program instructions have been handled. However, whilst this approach allows a balance to be struck through empirical observation of how often checkpoint information is required to be referred to, it suffers from the disadvantage that checkpoints may not be stored at the most desirable point to return to in the sequence of program instructions, and hence an inefficiency arises by having to rewind the instruction execution further than is strictly necessary.

Also, it is known to store checkpoint information when particular kinds of instruction are executed, such as the branch instructions mentioned above, or instructions which are expected to be likely to result in an exception being generated. Hence, when these instructions turn out to have been incorrectly executed (wrong branch predicted) or generate an exception, checkpoint information is available allowing the data processing apparatus to return to the required instruction.

FIG. 1 schematically illustrates a known arrangement of a data processing apparatus 10, wherein checkpoint circuitry 20 and execution circuitry 30 are provided. The checkpoint circuitry 20 monitors the sequence of instructions received which are then passed on to the execution circuitry 30. The checkpoint circuitry 20 stores checkpoint information 40 in association with particular instructions in a sequence (such as branch instructions), the checkpoint information providing sufficient information for the data processing apparatus to later be able to return to the point in the sequence of instructions at which that identified instruction occurred. Hence the execution circuitry 30 can make reference to the stored checkpoint information 40, which may for example include a program counter indicative of a selected point in the sequence of instructions to then return to that point when necessary.

It is also known that checkpointing is a useful technique for data processing apparatuses that are configured to execute program instructions out of order with respect to the program sequence. Since out of order program execution allows a later instruction to be executed before an earlier instruction, if the earlier instruction causes a fault (e.g. a memory abort) it is necessary to return the data processing apparatus to a state prior to the execution of both instructions. "Checkpoint Repair for Out-of-order Execution Machines", W. Hwu and Y. Patt, Proceedings of the 14$^{th}$ Annual International Symposium on Computer Architecture, pp. 18-26, 1987 provides some background information on checkpointing in out-of-order data processing apparatuses.

It would be desirable to provide an improved technique for checkpointing.

SUMMARY OF THE INVENTION

Viewed from a first aspect, the present invention provides a data processing apparatus comprising: execution circuitry configured to execute a sequence of program instructions; checkpoint circuitry configured to identify an instance of a predetermined type of instruction in said sequence of program instructions and to store checkpoint information associated with said instance of said predetermined type of instruction, said checkpoint information identifying a state of said data processing apparatus prior to execution of said instance of said predetermined type of instruction, wherein said predetermined type of instruction has an expected long completion latency, and wherein if said execution circuitry does not complete execution of said instance of said predetermined type of instruction due to occurrence of a predetermined event, said data processing apparatus is arranged to reinstate said state of said data processing apparatus with reference to said checkpoint information, such that said execution circuitry is configured to recommence execution of said sequence of program instructions at said instance of said predetermined type of instruction.

According to the techniques of the present invention, the checkpoint circuitry is configured to store checkpoint information when an instance of a predetermined type of instruction is identified in the sequence of program instructions being executed by the execution circuitry. In particular, the predetermined type of instruction for which the checkpoint circuitry is configured to store checkpoint information is instructions which have an expected long completion latency. Depending on the complexity of the data processing apparatus and the instructions it is configured to execute, there can be a wide range of expected completion latencies for program instructions. Whilst some simple instructions may complete in a relatively low number of clock cycles, other instructions may take considerable longer. For example, instructions which cause the execution circuitry to perform complicated mathematical calculations, or instructions which cause the execution circuitry to access external memory, may take hundreds of clock cycles to complete.

The inventors of the present invention realised that it would be advantageous to introduce the expected completion latency of an instruction as a criterion on which to base the decision of when to store associated checkpoint information. This is because whilst the execution circuitry is carrying out execution of a given instruction, normal execution of that instruction may be interrupted by a predetermined event, for example the receipt of an interrupt by the data processing apparatus. Furthermore, the longer the completion latency of an instruction, the more likely it is to be prevented from completing by an intervening event such as an interrupt. If such a predetermined event does prevent execution of an instruction from completing, then it is advantageous if checkpoint information associated with that instruction is available such that the execution circuitry can be configured to restart the execution of that instruction once the predetermined event has been dealt with (for example by carrying out an interrupt service routine).

Hence the expected completion latency of an instruction is set as a criterion according to which the checkpoint circuitry decides whether or not to store checkpoint information in association with a given instruction in the sequence of program instructions being executed by the execution circuitry.

Storing checkpoint information can be beneficial in a number of situations. In one embodiment said execution circuitry is configured to perform speculative execution of at least some of said program instructions before they are confirmed to be required to be executed. When the execution circuitry speculatively executes instructions this will often require assumptions to be made, for example about the direction that a particular branch instruction will take. When such an assumption is proved incorrect, it is necessary to rewind the state of the data processing apparatus to the point at which the incorrect assumption was made and a checkpoint stored in association with this point enables this.

In some embodiments said data processing apparatus further comprises branch prediction circuitry, said branch prediction circuitry configured to predict an outcome of a branch instruction and to cause said execution circuitry to perform said speculative instruction execution on the basis of said outcome. The ability to predict the outcome of a branch instruction (for example by assuming that a branch instruction will take the same direction that was taken last time that branch instruction was encountered) enables the execution circuitry to begin execution of instructions which follow the branch instruction before the actual outcome of the branch instruction is confirmed. This enables the execution circuitry to operate more efficiently, for example in a pipelined execution unit the stages of the pipeline can be more densely filled, without bubbles occurring when a branch instruction is encountered.

In some such embodiments, said checkpoint circuitry further comprises branch monitoring circuitry configured to store branch information as said checkpoint information until said outcome of said branch instruction is known, said branch information indicative a position of said branch instruction in said sequence of program instructions. Accordingly, reference to the branch information stored in the branch monitoring circuitry can be made, for example when it is determined that a branch was incorrectly predicted, and the position of the branch instruction in the sequence of program instructions can be derived. On this basis the execution circuitry can be configured to return to that position in the sequence of program instructions to recommence program execution.

In some embodiments said checkpoint circuitry is configured, upon identification of said instance of said predetermined type of instruction, to store branch information in said branch monitoring circuitry associated with said instance of said predetermined type of instruction. The provision of checkpoint circuitry arranged to store checkpoint information is an overhead cost for the data processing apparatus. Since all checkpoint information will not necessarily be referred to, the choice to store additional checkpoint information must be justified in terms of performance benefit. However, the inventors of the present invention realised that this overhead cost could be reduced when seeking to store checkpoint information for instructions which have an expected long completion latency, by reusing a pre-existing mechanism for handling branch instructions, namely the branch monitoring circuitry. The branch information is normally used to indicate a position of the branch instruction within the sequence of program instructions, such that the execution circuitry can return to the position of that branch instruction in the sequence of program instructions.

Hence an instruction that has an expected long completion latency can be treated as if it was speculatively executed. Consequently, if the predetermined event which causes the execution circuitry to not complete execution of the long latency instruction does occur, this instruction can simply be treated as if it were a mis-speculated branch instruction. This means that it is not necessary to wait for the instruction with the expected long completion latency to complete before any other processing by the execution circuitry can be undertaken.

In some embodiments the data processing apparatus further comprises a pending instruction table, said pending instruction table configured to store a sequence of entries indicative of pending instructions for which execution has started but not yet completed. Such a pending instruction table allows the data processing apparatus to keep track of instructions which are part-way through execution, so that in the event of a disruption to the execution of these instructions (e.g. an exception being generated), the data processing apparatus has a record of the following instructions which will be affected by that disruption. Hence in such embodiments a pre-existing mechanism can be re-used when checkpointing expected long latency instructions according to the techniques of the present invention, such that if the predetermined event prevents a long latency instruction from completing, the data processing apparatus can make reference to the pending instruction table to determine which following instructions are affected.

The pending instruction table could take a number of forms and in one embodiment said pending instruction table is configured as a FIFO device.

In some embodiments, said data processing apparatus is configured, on occurrence of said predetermined event, to flush from said pending instruction table an entry corresponding to said instance of said predetermined type of instruction and any following entries in said sequence of entries. It is recognised that not only will the instance of the predetermined type of instruction be prevented from completing by the predetermined event, but also any instructions which followed that instance in the execution pathway. Thus, the data processing apparatus is arranged to flush the entry corresponding to the long latency instruction and the instructions which follow it from the pending instruction table.

In one embodiment said predetermined event comprises receipt of an interrupt. If the data processing apparatus were to have to wait until the instruction currently being executed completes before handling the interrupt, and if that instruction has a long completion latency, significant delay before responding to the interrupt could be incurred. In applications where a swift response to an interrupt is required, this could jeopardise the ability of the data processing apparatus to promptly respond to interrupts. However, by storing checkpoint information in association with instructions that have an expected long completion latency, the data processing apparatus is provided with the ability to abandon execution of such an instruction even midway through execution, rewinding execution flow using the checkpoint information stored in association with that instruction, and thus the interrupt response time is kept short.

The checkpoint information identifying a state of the data processing apparatus could take a number of forms, but in one embodiment said state comprises a program counter value. The program counter value provides an efficient mechanism to return the execution circuitry to a previous point in a sequence of program instructions.

The predetermined type of instruction could be any instruction which is expected to have a long completion latency, but in some embodiments, said predetermined type of instruction is a load or store instruction. The necessity to access external memory for a load or store instruction can often mean that such instructions take hundreds of cycles to complete. Other types of instruction may also have long completion latency, purely by virtue of the complexity of the operations they must perform, for example in one embodiment said predetermined type of instruction is a floating point calculation instruction.

Viewed from a second aspect the present invention provides a data processing apparatus comprising: execution means for executing a sequence of program instructions; checkpoint means for identifying an instance of a predetermined type of instruction in said sequence of program instructions and storing checkpoint information associated with said instance of said predetermined type of instruction, said checkpoint information identifying a state of said data processing apparatus prior to execution of said instance of said predetermined type of instruction, wherein said predetermined type of instruction has an expected long completion latency, and wherein if said execution means does not complete execution of said instance of said predetermined type of instruction due to occurrence of a predetermined event, said data processing apparatus is arranged to reinstate said state of said data processing apparatus with reference to said checkpoint information, such that said execution means is configured to recommence execution of said sequence of program instructions at said instance of said predetermined type of instruction.

Viewed from a third aspect the present invention provides a method of data processing in a data processing apparatus comprising the steps of: executing a sequence of program instructions; identifying an instance of a predetermined type of instruction in said sequence of program instructions; storing checkpoint information associated with said instance of said predetermined type of instruction, said checkpoint information identifying a state of said data processing apparatus prior to execution of said instance of said predetermined type of instruction, wherein said predetermined type of instruction has an expected long completion latency, and if execution of said instance of said predetermined type of instruction is not completed due to occurrence of a predetermined event, reinstating said state of said data processing apparatus with reference to said checkpoint information, such that execution of said sequence of program instructions recommences at said instance of said predetermined type of instruction.

BRIEF DESCRIPTION OF THE DRAWINGS

The present invention will be described further, by way of example only, with reference to embodiments thereof as illustrated in the accompanying drawings, in which.

DESCRIPTION OF THE PREFERRED EMBODIMENTS

Figure 1:
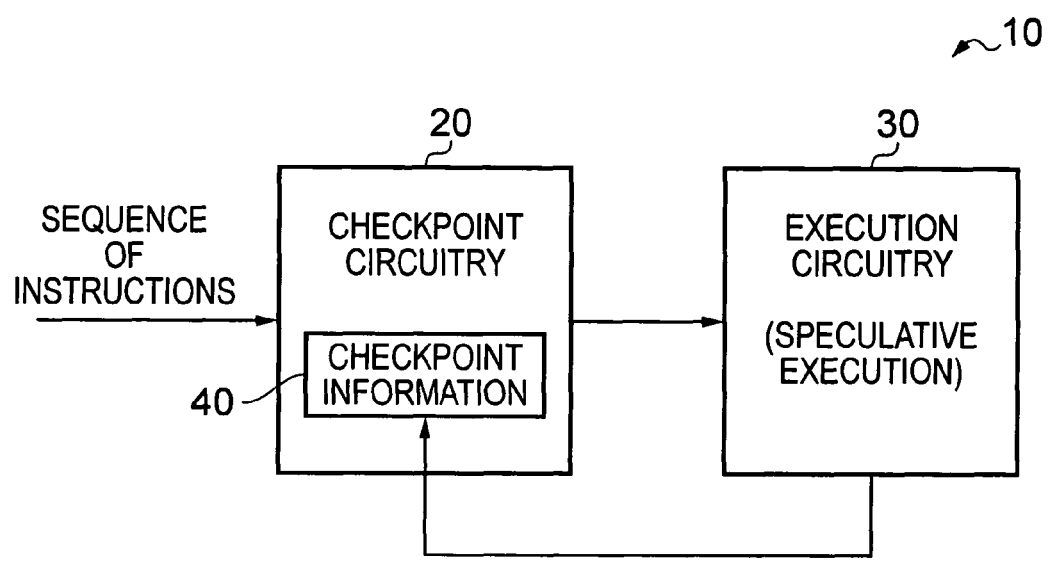
FIG. 1 schematically illustrates a known arrangement of a data processing apparatus having checkpoint circuitry and execution circuitry.
Figure 2:
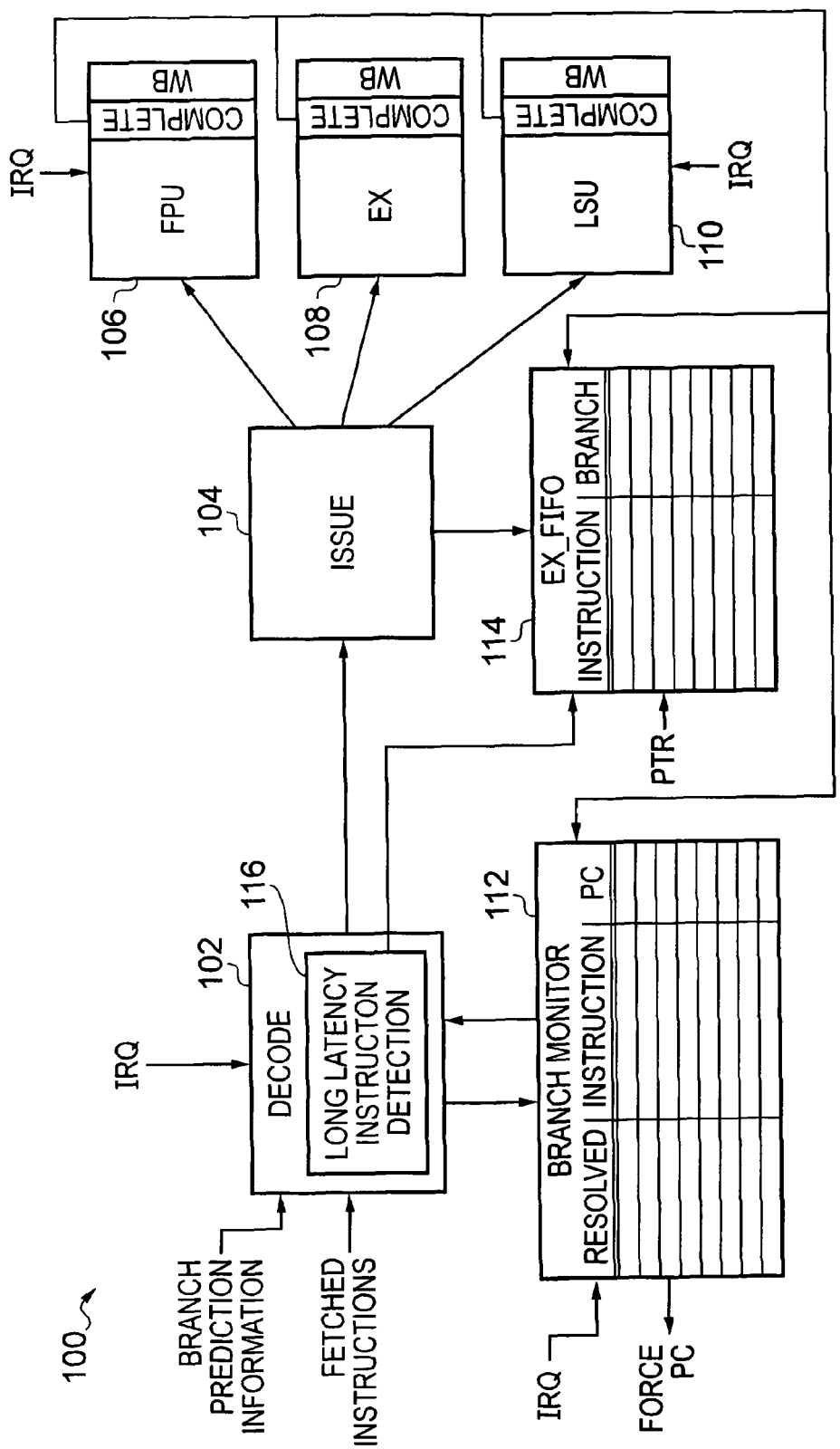
FIG. 2 schematically illustrates a data processing apparatus according to one embodiment.

FIG. 2 schematically illustrates a data processing apparatus 100 in accordance with one embodiment. The data processing apparatus 100 is a pipelined processor, wherein fetched instructions are received by decode unit 102 which decodes the instructions, passing them to issue unit 104, which schedules the instructions, allocating them to one of the available execution pipelines. Whilst it will be appreciated that the execution pipelines could vary in number, in the illustrated example embodiment three are shown, namely a floating point unit (FPU) 106, a generic execution Unit (EX) 108 and a load unit (LSU) 110. The data processing apparatus 100 also comprises a branch monitor 112 and an exception FIFO (EX_FIFO) 114, the functions of which will be described in more detail hereinafter.

Decode unit 102 receives both a stream of fetched instructions and also branch prediction information (from branch prediction circuitry, not illustrated). Within decode unit 102 is long latency instruction detection unit 116, which is configured to monitor the instructions being handled by decode unit 102 and to identify those instructions which are expected to have a long completion latency, i.e. which are expected (once issued by issue unit 104 to one of the execution pipelines) to have a long latency before the respective execution pipeline indicates that the instruction has completed. The final two stages of each execution pipeline are labelled "complete" and "write back (WB)". Once an instruction reaches the "complete" stage of an execution pipeline, that execution pipeline can signal to the rest of the data processing apparatus that the instruction has been fully executed. The final stage of each execution pipeline, the write back stage, is where each execution pipeline writes its results into the register file.

When decode unit 102 encounters a branch instruction, it is configured to cause branch monitor 112 to store an additional entry in its table corresponding to the branch instruction. Entries in the branch monitor table comprise an indication of the instruction itself, its associated program counter and an indication as to when it is resolved. Hence, the branch monitor unit 112 enables the data processing unit 100 to track the branch instructions where program execution has continued on the basis of branch prediction, such that if a branch turns out to have been incorrectly predicted, the data processing apparatus can refer to the branch monitor unit to retrieve the corresponding program counter to which it should return.

Once a branch instruction is resolved this is indicated in the corresponding entry in the branch monitor unit.

The data processing apparatus 100 is also provided with an exception FIFO 114 into which the issue unit 104 adds entries corresponding to the instructions it schedules for the execution pipelines. An entry in the EX_FIFO 114 has an indication of the corresponding instruction and has a further column to keep track of which instructions are branch instructions. An architectural pointer (PTR) is configured to point to the oldest instruction in EX_FIFO 114 which has not been committed. Once an instruction is indicated by the execution pipelines 106, 108, 110 to have completed the architectural pointer PTR is moved accordingly with respect to the entries of the EX_FIFO 114. Conversely, if it turns out that a branch was incorrectly predicted, the contents of the EX_FIFO 114 are flushed as far back as the incorrectly predicted branch.

The long latency instruction detection unit 116 in decode unit 102 is configured to monitor the stream of instructions being decoded in decode unit 102 and to identify instructions which are expected to have a long completion latency. In the illustrated embodiment, two types of instruction which the long latency instruction detection unit 116 is configured to detect are an FDIV instruction (which will be executed in floating point unit 106) and a load/store instruction (which will be executed in load/store unit 110). Upon identification of one of these predetermined types of instruction, the long latency instruction detection unit 116 is configured to signal to branch monitor unit 112 that an entry should be stored corresponding to the identified instruction. This entry stored in branch monitor unit 112 takes the same form as an entry stored for a predicted branch, having an associated program counter value. Effectively, the entry can be considered to be a "branch-to-self" for the long latency instruction.

The data processing apparatus 100 is also configured to respond to the interrupt signal IRQ. When the IRQ signal is received it is advantageous if the data processing apparatus can respond without delay by beginning execution of the corresponding interrupt service routine. The embodiment illustrated in FIG. 2 enables this to happen through the re-use of the branch monitor unit 112 and the EX_FIFO 114. If the IRQ signal is received whilst a long latency instruction is currently being executed (e.g. a FDIV instruction is part way through execution in FPU 106), the data processing apparatus 100 then treats this instruction as though it were a mis-predicted branch instruction flushing this instruction and all instructions that follow it in the EX_FIFO 114. The ordered entries in the EX_FIFO 114 which follow the long latency instruction enable the data processing apparatus 100 to recover the architectural state back to the point where the long latency instruction was issued (recovering renamed registers and so on) in the same way that this would happen if a branch were found to be mispredicted.

Figure 3:
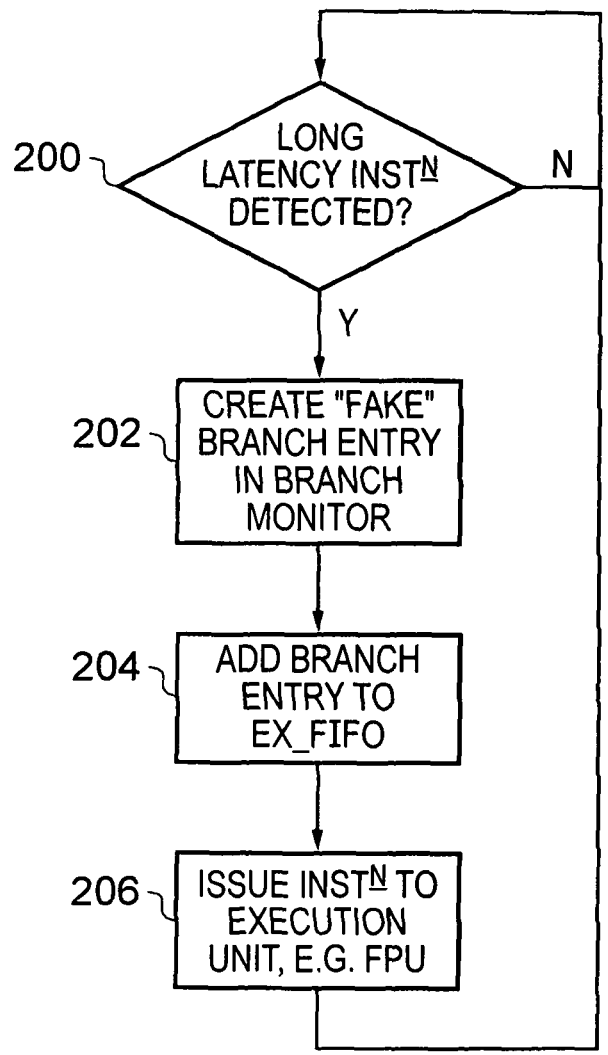
FIG. 3 is a flow diagram illustrating a series of steps taken by a data processing apparatus according to one embodiment when a long latency instruction is detected.

FIG. 3 schematically illustrates the basis steps that are carried out in data processing apparatus 100 on detection of a long latency instruction in the stream of fetched instructions. Firstly, the flow waits at step 200 until a long latency instruction is detected. Then at step 202 the long latency instruction detection unit 116 signals to branch monitor unit 112 to create a "fake" branch entry corresponding to the detected long latency instruction. Then the long latency instruction detection unit 116 signals to the EX_FIFO 114 that the instruction should be marked as a branch entry in its table (step 204) and at step 206 then issue unit 104 issues this instruction to the corresponding execution unit (for example an FDIV instruction going to FPU 106). It should be noted that although steps 202, 204 and 206 are illustrated as a sequence of events, in fact since these three steps take place in branch monitor 112, EX_FIFO 114 and issue unit 104, they can be considered to take place simultaneously or in a different order to that illustrated. The only constraint is that by the time the instruction begins execution that the corresponding entries in branch monitor unit 112 and EX_FIFO 114 should be in place.

Figure 4:
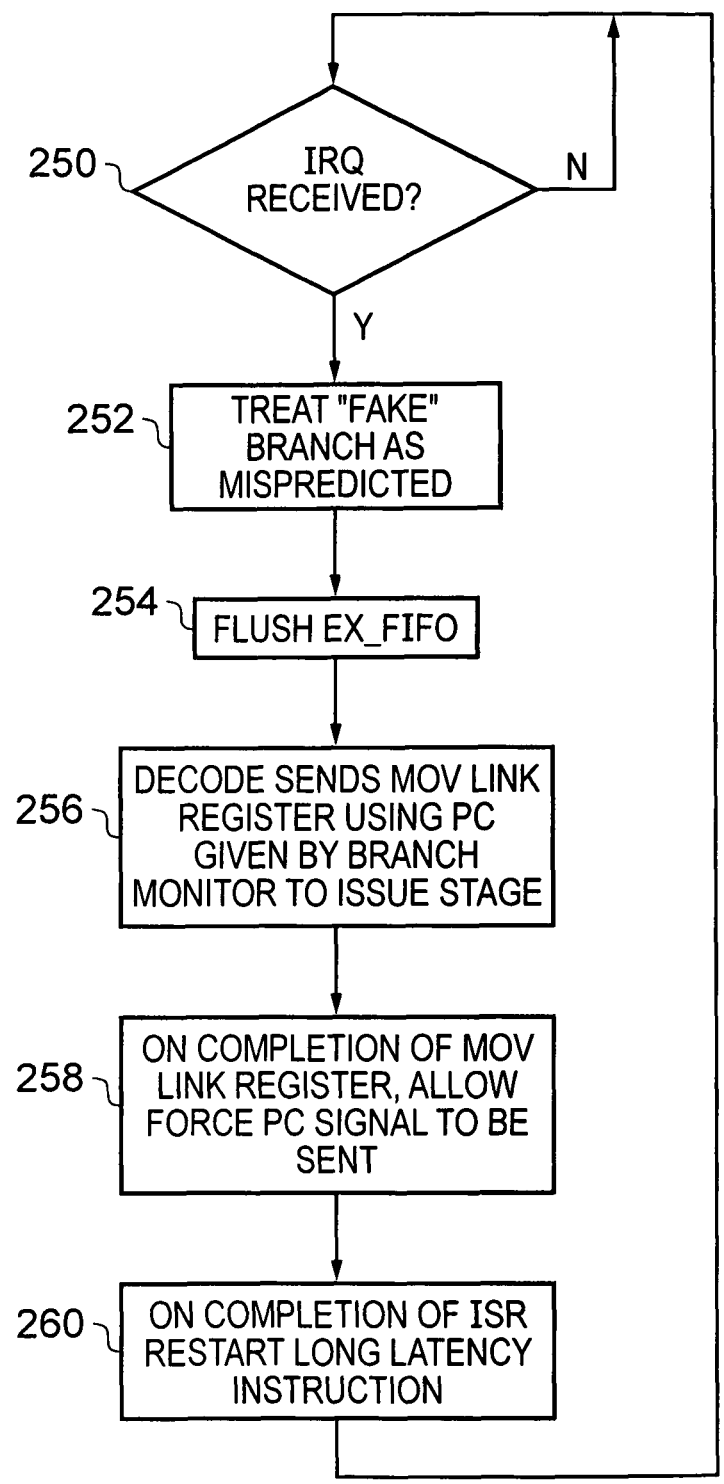
FIG. 4 is a flow diagram illustrating a series of steps taken by a data processing apparatus in one embodiment when an interrupt is received.

FIG. 4 schematically illustrates a series of steps taken in the data processing apparatus 100 when the IRQ signal is received. Firstly the flow waits at step 250 until the IRQ signal is received. Then (step 252) the fake branch associated with the long latency instruction is treated as mis-predicted. Hence at step 254 the EX_FIFO is flushed, clearing the entry corresponding to the long latency instruction and any instructions following it. Then at step 256 the program counter associated with the long latency instruction (taken from the table in branch monitor 112) is passed to the decode unit 102 which sends a MOV instruction to copy the program counter value PC into the link register r14. This preserves the associated program counter for once the interrupt service routine has completed. Issue unit 104 then issues this MOV instruction to an appropriate execution unit (e.g. EX 108). Once this instruction has completed, at step 258, the completion signal allows the FORCE PC signal to be sent from the branch monitor which causes the data processing apparatus to begin completion of an interrupt service routine (ISR). Once the ISR has completed, at step 260 the long latency instruction can be restarted by reloading the program counter from the link register.

Although particular embodiments of the invention have been described herein, it will be apparent that the invention is not limited thereto, and that many modifications and additions may be made within the scope of the invention. For example, various combinations of the features of the following dependent could be made with the features of the independent claims without departing from the scope of the present invention.

We claim:

1. A data processing apparatus comprising:
   execution circuitry configured to execute a sequence of program instructions;
   checkpoint circuitry configured to identify an instance of a predetermined type of instruction in said sequence of program instructions and to store checkpoint information associated with said instance of said predetermined type of instruction, said checkpoint information identifying a state of said data processing apparatus prior to execution of said instance of said predetermined type of instruction,
   wherein said predetermined type of instruction has an expected long completion latency, and
   wherein if said execution circuitry does not complete execution of said instance of said predetermined type of instruction due to occurrence of a predetermined event, said data processing apparatus is arranged to reinstate said state of said data processing apparatus with reference to said checkpoint information, such that said execution circuitry is configured to recommence execution of said sequence of program instructions at said instance of said predetermined type of instruction, wherein said execution circuitry is configured to perform speculative execution of at least some of said program instructions before they are confirmed to be required to be executed, wherein said data processing apparatus further comprises branch prediction circuitry, said branch prediction circuitry configured to predict an outcome of a branch instruction and to cause said execution circuitry to perform said speculative instruction execution on the basis of said outcome, wherein said checkpoint circuitry further comprises branch monitoring circuitry configured to store branch information as said checkpoint information until said outcome of said branch instruction is known, said branch information indicative of a position of said branch instruction in said sequence of program instructions, wherein said checkpoint circuitry is configured, upon identification of said instance of said predetermined type of instruction, to store as said branch information in said branch monitoring circuitry associated with said instance of said predetermined type of instruction information indicative of a position of said predetermined type of instruction in said sequence of instructions.

2. A data processing apparatus as claimed in claim 1, wherein said data processing apparatus further comprises a pending instruction table, said pending instruction table configured to store a sequence of entries indicative of pending instructions for which execution has started but not yet completed.

3. A data processing apparatus as claimed in claim 2, wherein said pending instruction table is configured as a FIFO device.

4. A data processing apparatus as claimed in claim 2, wherein said data processing apparatus is configured, on occurrence of said predetermined event, to flush from said pending instruction table an entry corresponding to said instance of said predetermined type of instruction and any following entries in said sequence of entries.

5. A data processing apparatus as claimed in claim 1, wherein said predetermined event comprises receipt of an interrupt.

6. A data processing apparatus as claimed in claim 1, wherein said state comprises a program counter value.

7. A data processing apparatus as claimed in claim 1, wherein said predetermined type of instruction is a load or store instruction.

8. A data processing apparatus as claimed in claim 1, wherein said predetermined type of instruction is a floating point calculation instruction.

9. A data processing apparatus comprising:
   execution means for executing a sequence of program instructions;
   checkpoint means for identifying an instance of a predetermined type of instruction in said sequence of program instructions and storing checkpoint information associated with said instance of said predetermined type of instruction, said checkpoint information identifying a state of said data processing apparatus prior to execution of said instance of said predetermined type of instruction,
   wherein said predetermined type of instruction has an expected long completion latency, and
   wherein if said execution means does not complete execution of said instance of said predetermined type of instruction due to occurrence of a predetermined event, said data processing apparatus is arranged to reinstate said state of said data processing apparatus with reference to said checkpoint information, such that said execution means is configured to recommence execution of said sequence of program instructions at said instance of said predetermined type of instruction, wherein said execution means is configured to perform speculative execution of at least some of said program instructions before they are confirmed to be required to be executed, wherein said data processing apparatus further comprises branch prediction means for predicting an outcome of a branch instruction and for causing said execution means to perform said speculative instruction execution on the basis of said outcome, wherein said checkpoint means further comprises branch monitoring means configured to store branch information as said checkpoint information until said outcome of said branch instruction is known, said branch information indicative of a position of said branch instruction in said sequence of program instructions, wherein said checkpoint means is configured, upon identification of said instance of said predetermined type of instruction, to store as said branch information in said branch monitoring means associated with said instance of said predetermined type of instruction information indicative of a position of said predetermined type of instruction in said sequence of instructions.

10. A method of data processing in a data processing apparatus comprising the steps of:
   executing a sequence of program instructions;
   identifying an instance of a predetermined type of instruction in said sequence of program instructions;
   storing checkpoint information associated with said instance of said predetermined type of instruction, said checkpoint information identifying a state of said data processing apparatus prior to execution of said instance of said predetermined type of instruction,
   wherein said predetermined type of instruction has an expected long completion latency, and
   if execution of said instance of said predetermined type of instruction is not completed due to occurrence of a predetermined event, reinstating said state of said data processing apparatus with reference to said checkpoint information, such that execution of said sequence of program instructions recommences at said instance of said predetermined type of instruction, wherein said executing step performs speculative execution of at least some of said program instructions before they are confirmed to be required to be executed, wherein said method comprises a step of predicting an outcome of a branch instruction and causing the executing step to perform said speculative instruction execution on the basis of said outcome, wherein said storing checkpoint information step stores branch information as said checkpoint information until said outcome of said branch instruction is known, said branch information indicative of a position of said branch instruction in said sequence of program instructions, and wherein said method comprises the further step of, upon identification of said instance of said predetermined, type of instruction, storing said branch information associated with said instance of said predetermined type of instruction information indicative of a position of said predetermined type of instruction in said sequence of instructions.

* * * * *